United States Patent
Lee et al.

(10) Patent No.: US 7,382,433 B2
(45) Date of Patent: Jun. 3, 2008

(54) APPARATUS AND METHOD FOR MANUFACTURING A LIQUID CRYSTAL DISPLAY DEVICE, A METHOD FOR USING THE APPARATUS, AND A DEVICE PRODUCED BY THE METHOD

(75) Inventors: Sang Seok Lee, Taegu-kwangyokshi (KR); Sang Ho Park, Pusan-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 14 days.

(21) Appl. No.: 11/015,031

(22) Filed: Dec. 20, 2004

(65) Prior Publication Data
US 2005/0099584 A1    May 12, 2005

Related U.S. Application Data

(63) Continuation of application No. 10/126,546, filed on Apr. 22, 2002, now Pat. No. 6,859,250.

(30) Foreign Application Priority Data
Feb. 4, 2002    (KR) .............................. 10-2002-6307

(51) Int. Cl.
   *G02F 1/13*    (2006.01)
(52) U.S. Cl. ....................... 349/187; 349/190
(58) Field of Classification Search ................. 349/190
   See application file for complete search history.

(56) References Cited

U.S. PATENT DOCUMENTS 3,978,580 A    9/1976    Leupp et al.
4,094,058 A    6/1978    Yasutake et al.
4,653,864 A    3/1987    Baron et al.
4,691,995 A    9/1987    Yamazaki et al.
4,775,225 A    10/1988   Tsuboyama et al.
5,247,377 A    9/1993    Omeis et al.
5,263,888 A    11/1993   Ishihara et al.
5,379,139 A    1/1995    Sato et al.
5,406,989 A    4/1995    Abe
5,499,128 A    3/1996    Hasegawa et al.
5,507,323 A    4/1996    Abe
5,511,591 A    4/1996    Abe
5,539,545 A    7/1996    Shimizu et al.
5,548,429 A    8/1996    Tsujita
5,642,214 A    6/1997    Ishii et al.
5,680,189 A    10/1997   Shimizu et al.

(Continued)

FOREIGN PATENT DOCUMENTS

EP    1 003 066 A1    5/2000

(Continued)

*Primary Examiner*—David Nelms
*Assistant Examiner*—Richard H Kim
(74) *Attorney, Agent, or Firm*—McKenna Long & Aldridge LLP

(57) ABSTRACT

An apparatus for manufacturing a liquid crystal display device includes a first reverse unit for reversing a first substrate, a bonding unit for bonding the reversed first substrate and a second substrate having a liquid crystal material deposited thereon, and a first loading/unloading unit arranged between the first reverse unit and the bonding unit for loading the first and second substrates into the bonding unit.

18 Claims, 7 Drawing Sheets

U.S. PATENT DOCUMENTS

| | | | |
|---|---|---|---|
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato et al. | |
| 5,956,112 A | 9/1999 | Fujimori et al. | |
| 5,978,065 A * | 11/1999 | Kawasumi et al. | 349/188 |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | Von Gutfeld et al. | |
| 6,163,357 A | 12/2000 | Nakamura | |
| 6,219,126 B1 | 4/2001 | Von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,646,689 B2 * | 11/2003 | Matsuda | 349/1 |
| 6,665,043 B1 * | 12/2003 | Okuyama et al. | 349/187 |
| 6,825,910 B2 * | 11/2004 | Aoki et al. | 349/190 |
| 2001/0004281 A1 | 6/2001 | Sasaki | |
| 2001/0021000 A1 | 9/2001 | Egami | |
| 2002/0008838 A1 | 1/2002 | Matsuda | |

FOREIGN PATENT DOCUMENTS

| | | |
|---|---|---|
| EP | 003 066 A1 | 5/2000 |
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 4042210 | 2/1992 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6208096 | 7/1994 |
| JP | 6-235925 | 8/1994 |
| JP | 6-265915 | 9/1994 |
| JP | 6-313870 | 11/1994 |
| JP | 6308474 | 11/1994 |
| JP | 7-84268 | 3/1995 |
| JP | 7-128674 | 5/1995 |
| JP | 7-181507 | 7/1995 |
| JP | 8-95066 | 4/1996 |
| JP | 8-101395 | 4/1996 |
| JP | 8-106101 | 4/1996 |
| JP | 08087020 A | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-137235 | 5/2000 |
| JP | 2000-147528 | 5/2000 |
| JP | 2000-193988 | 7/2000 |
| JP | 2000223548 | 8/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-1337945 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001206543 A | 7/2001 |
| JP | 2001-209052 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |

| | | | | | | |
|---|---|---|---|---|---|---|
| JP | 2001-264782 | 9/2001 | | JP | 2002-82340 | 3/2002 |
| JP | 2001-272640 | 10/2001 | | JP | 2002-90759 | 3/2002 |
| JP | 2001-281675 | 10/2001 | | JP | 2002-90760 | 3/2002 |
| JP | 2001-281678 | 10/2001 | | JP | 2002-107740 | 4/2002 |
| JP | 2001-282126 | 10/2001 | | JP | 2002-122872 | 4/2002 |
| JP | 2001-305563 | 10/2001 | | JP | 2002-122873 | 4/2002 |
| JP | 2001-330837 | 11/2001 | | JP | 2002-139734 | 5/2002 |
| JP | 2001-330840 | 11/2001 | | JP | 2002-202512 | 7/2002 |
| JP | 2001-356353 | 12/2001 | | JP | 2002-202514 | 7/2002 |
| JP | 2001-356354 | 12/2001 | | JP | 2002-214626 | 7/2002 |
| JP | 2002-14360 | 1/2002 | | KR | 2000-0035302 | 6/2000 |
| JP | 2002-23176 | 1/2002 | | KR | 2003-38943 | 5/2003 |
| JP | 2002023125 A | 1/2002 | | | | |
| JP | 2002-49045 | 2/2002 | | * cited by examiner | | |

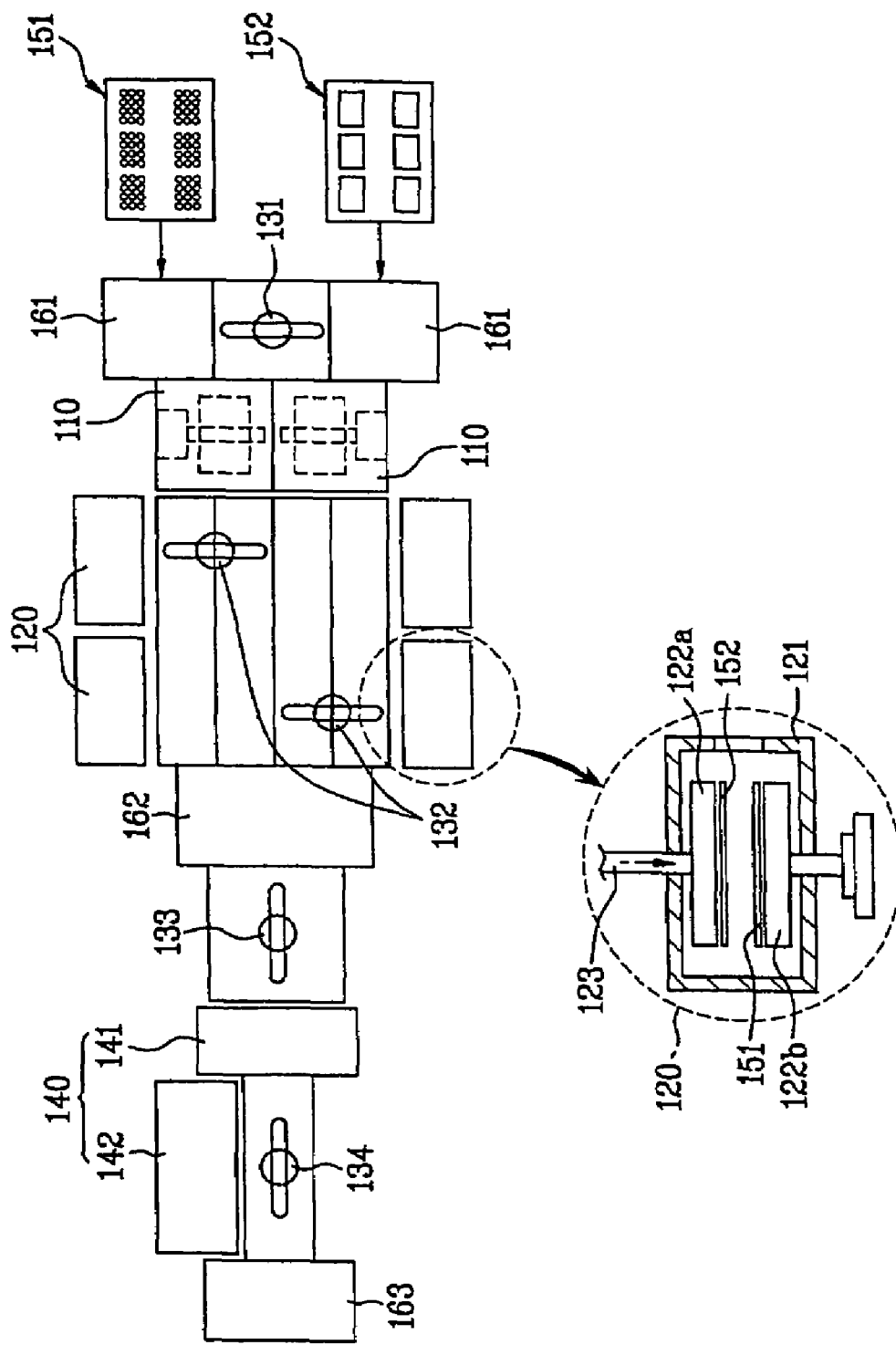

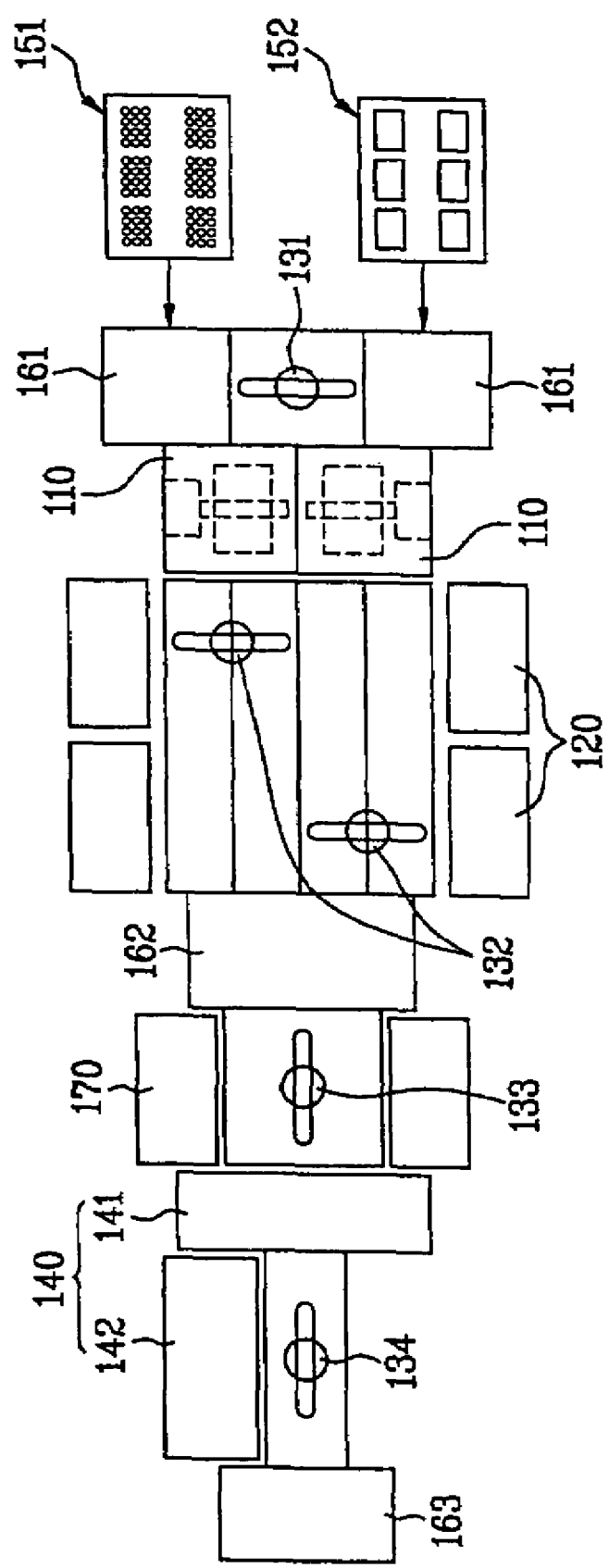

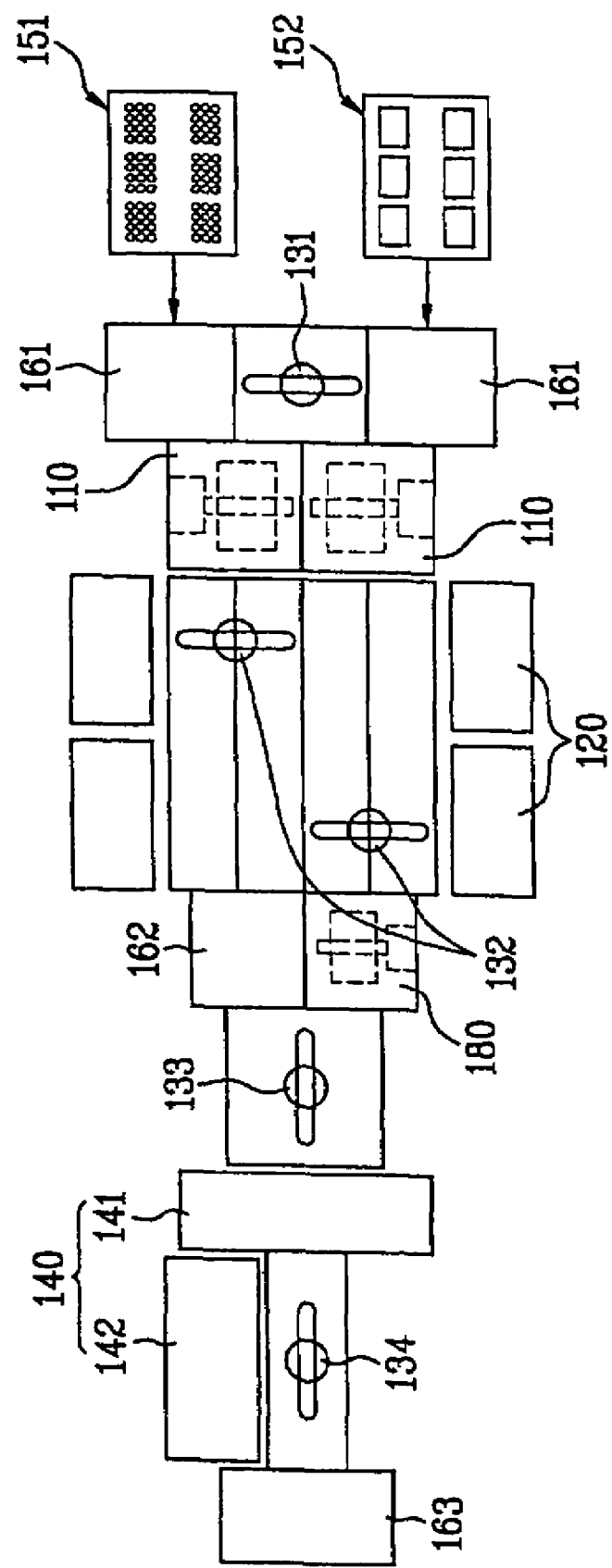

APPARATUS AND METHOD FOR MANUFACTURING A LIQUID CRYSTAL DISPLAY DEVICE, A METHOD FOR USING THE APPARATUS, AND A DEVICE PRODUCED BY THE METHOD

This is a continuation of application Ser. No. 10/126,546, filed on Apr. 22, 2002 now U.S. Pat. No. 6,859.250.

The present application claims the benefit of the Korean Patent Application No. P2002-006307 filed in Korea on Feb. 4, 2002, which is hereby incorporated by reference.

BACKGROUND OF THE INVENTION

1. Field of the Invention

The present invention relates to a manufacturing device, and more particularly, to an apparatus and method for manufacturing a liquid crystal display (LCD) suitable for a large-sized liquid crystal display.

2. Discussion of the Related Art

In general, recent developments in the information communication field have increased demand for various types of display devices. In response to this demand, various flat panel type displays such as liquid crystal display (LCD), plasma display panel (PDP), electro-luminescent display (ELD), and vacuum fluorescent display (VFD) have been developed to replace conventional cathode ray tube (CRT) devices. In particular, LCD devices have been used because of their high resolution, light weight, thin profile, and low power consumption. In addition, LCD devices have been implemented in mobile devices such as monitors for notebook computers. Furthermore, LCD devices have been developed for monitors of computer and television to receive and display broadcasting signals.

Accordingly, efforts to improve image quality of LCD devices contrast with the benefits of their high resolution, light weight, thin profile, and low power consumption. In order to incorporate LCD devices as a general image display, image quality such as fineness, brightness, large-sized area, for example, must be realized.

LCD devices are provided with an LCD panel for displaying an image, and a driving unit for applying a driving signal to the LCD panel. The LCD panel is provided with first and second glass substrates bonded at a certain distance with liquid crystal material injected therebetween. A plurality of gate lines are formed along one direction at fixed intervals on the first glass substrate (TFT array substrate), and a plurality of data lines are formed along a second direction perpendicular to one direction of the plurality of gate lines, thereby defining a plurality of pixel regions. Then, a plurality of pixel electrodes are formed in a matrix arrangement at the pixel regions, and a plurality of thin film transistors (TFT) are formed at the pixel regions. Accordingly, the plurality of thin film transistors are switched by signals transmitted along the gate lines and transfer signals transmitted along the data lines to each pixel electrode. In order to prevent light leakage, black matrix films are formed on the second glass substrate (color filter substrate) except at regions of the second glass substrate that correspond to the pixel regions of the first glass substrate.

A process for manufacturing an LCD panel device using a TFT substrate and a color filter substrate will be described with reference to a manufacturing apparatus according to the related art.

FIG. 1 shows an apparatus for manufacturing an LCD panel device according to the related art. In FIG. 1, a first glass substrate TFT passes through a sealant dispensing unit 11 for dispensing sealant on the first glass substrate TFT, and a sealant drying unit 12 for drying the dispensed sealant. Simultaneously, a second glass substrate C/F passes through an Ag dotting unit 13 for dotting Ag on the second glass substrate C/F, and a spacer diispersion unit 14 for dispersing spacers on the second glass substrate C/F.

Then, the first and second glass substrates TFT and C/F are bonded together by a bonding unit 16, and the bonded substrates are hardened by a hardening unit 17. The bonded substrates are separated by a certain distance by the spacer, thereby forming a cavity spaced, and an injecting hole is formed at a certain region of a circumference of the bonded substrates. Subsequently, a liquid crystal material is injected by injecting unit 18 through the injecting hole into the cavity space formed between the bonded substrates, and the injecting hole is sealed. Then, the bonded substrates are cleaned by a cleaning unit 20, thereby completing the process of manufacturing the LCD panel device.

However, the apparatus for manufacturing the LCD panel device according to the related art using the liquid crystal injecting system is problematic. First, the liquid crystal material is injected into the cavity space between the bonded substrates bonded by the sealant through the injecting hole under vacuum due to a difference in pressure. Accordingly, injecting the liquid crystal material into the cavity space is time consuming. During manufacturing processes for making large sized LCD panel devices, it is necessary to improve a manufacturing efficiency of the processes by decreasing the processing time for injecting the liquid crystal material. Accordingly, it is necessary to improve efficiency of the manufacturing processes.

In addition, failures are generated during the injection of the liquid crystal materials if the processing time for injecting the liquid crystal material is increased. For example, injection of the liquid crystal material may be imperfect, thereby generating failures at a high rate. Second, the processing for manufacturing the LCD panel device is complex, and there is no method for determining whether the bonded substrates are properly bonded together. That is, it is hard to sense a degree with which the substrates are bonded.

SUMMARY OF THE INVENTION

Accordingly, the present invention is directed to an apparatus for manufacturing a liquid crystal display device, a method for using the apparatus, and a device produced by the apparatus that substantially obviates one or more problems due to limitations and disadvantages of the related art.

An object of the present invention is to provide an apparatus for manufacturing a liquid crystal display device suitable for a large-sized liquid crystal display.

Another object of the present invention is to provide a method for using an apparatus for manufacturing a liquid crystal display device suitable for a large-sized liquid crystal display.

Another object of the present invention is to provide a device produced by a method for manufacturing a liquid crystal display device suitable for a large-sized liquid crystal display.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, an apparatus for manufacturing a liquid crystal display device includes a first reverse unit for reversing a first substrate, a bonding unit for bonding the reversed first substrate and second substrate having a liquid crystal material deposited thereon, and a first loading/unloading unit arranged between the first reverse unit and the bonding unit for loading the first and second substrates into the bonding unit.

In another aspect, a method for manufacturing a liquid crystal display includes reversing a first substrate, loading the reversed first substrate and a second substrate having a liquid crystal material deposited thereon into a bonding unit, and bonding the first and second substrates.

In another aspect, a liquid crystal display device manufactured by a method including reversing at least one of a first substrate and a second substrate having a liquid crystal material disposed thereon, loading the first and second substrates into a bonding unit, and bonding the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings:

FIGS. 2A and 2B show an exemplary apparatus for manufacturing an LCD device according to the present invention;

FIG. 3 shows another exemplary apparatus for manufacturing an LCD device according to the present invention;

FIG. 4 shows another exemplary apparatus for manufacturing an LCD device according to the present invention;

DETAILED DESCRIPTION OF THE PREFERRED EMBODIMENTS

Reference will now be made in detail to the preferred embodiments of the present invention, examples of which are illustrated in the accompanying drawings.

Figure 1:
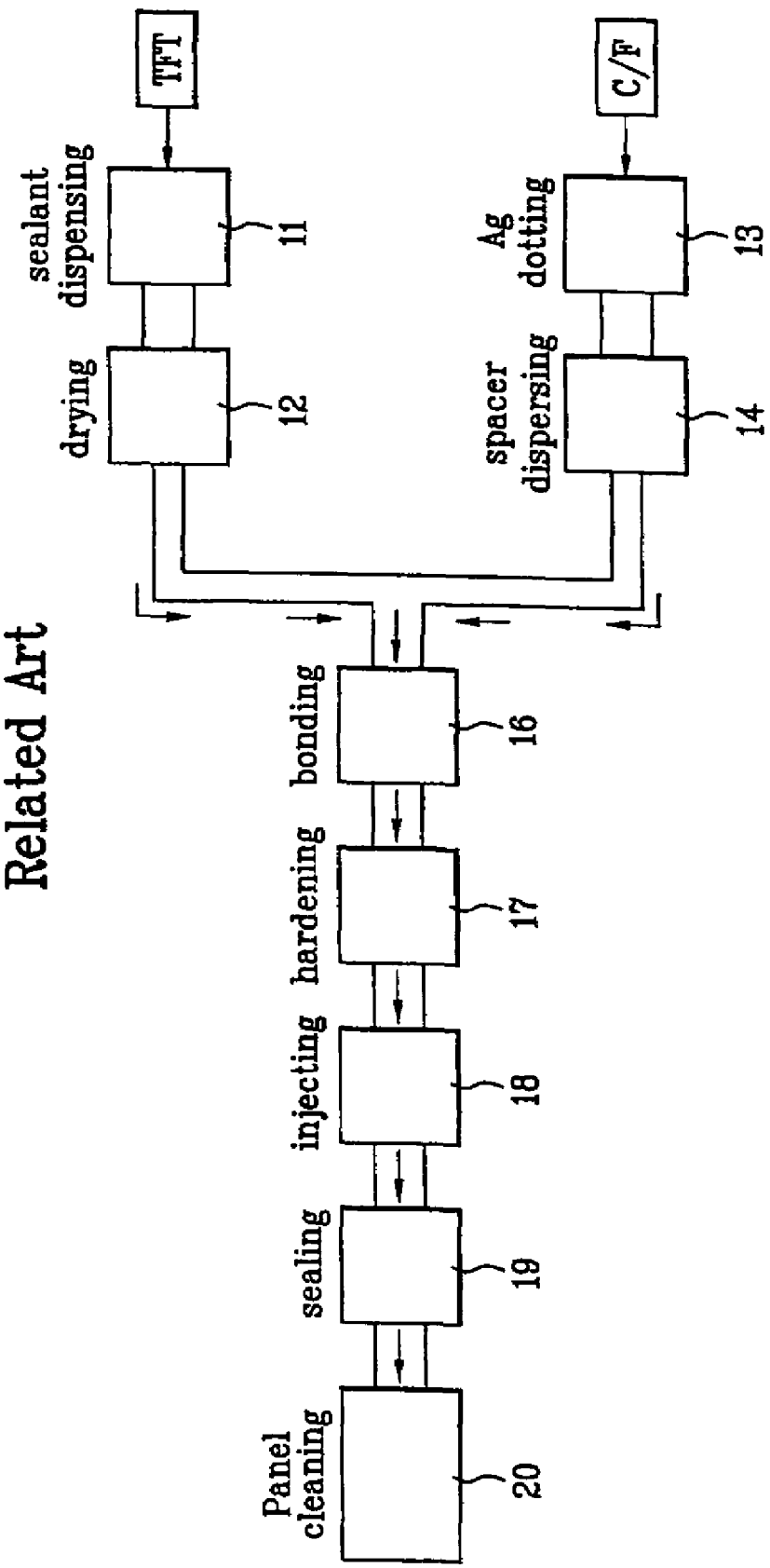
FIG. 1 shows an apparatus for manufacturing an LCD device according to the related art.
Figure 2A:
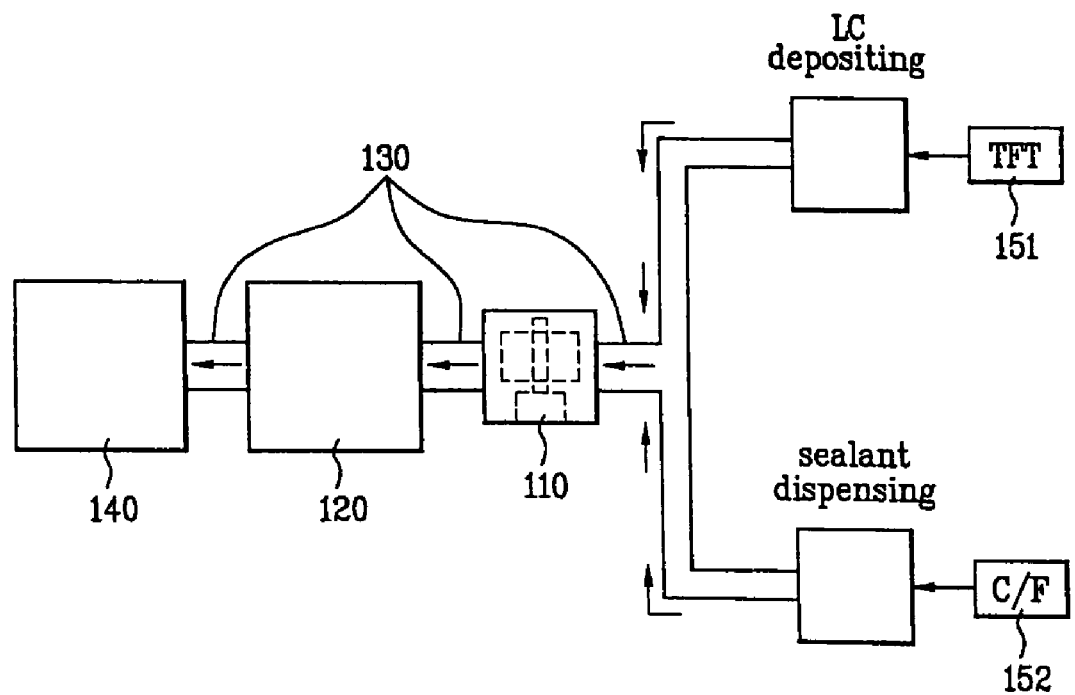

FIGS. 2A and 2B show an exemplary apparatus for manufacturing an LCD device according to the present invention. In FIGS. 2A and 2B, the apparatus may include a first reverse unit 110, at least one bonding unit 120 disposed within a vacuum processing chamber 121, and a plurality of loading/unloading units 130. In addition, the apparatus may be provided with a hardening unit 140.

A liquid crystal material may be deposited (i.e., drop dispensed) onto a first substrate 151, and a sealant (not shown) may be deposited onto a second substrate 152. Then, the first reverse unit 110 may reverse (i.e., flip) the second substrate 152 upon which the sealant is dispensed. The first reverse unit 110 may not necessarily reverse each of the first and second substrates 151 and 152, and may reverse only one of the first and second substrates 151 and 152 upon which the liquid crystal material is not deposited. Moreover, the first and second substrate 151 and 152, may be one of either a TFT array substrate or a color filer (C/F) substrate. Alternatively, the first reverse unit may reverse the substrate having the liquid crystal material deposited thereupon provided that the viscosity of the liquid crystal material is large enough so as to prevent any flow of the liquid crystal material during the reversing process.

The first reverse unit 110 may have various configurations based upon the assumption that only one the first and second substrates 151 and 152 may be reversed. For example, although not shown, the liquid crystal material may be deposited on the first substrate 151, which may be a C/F substrate, and the sealant may be deposited on the second substrate 152, which may be a TFT array substrate. Moreover, both the liquid crystal material and the sealant may be deposited on the first substrate 151, which may be a TFT array substrate, and the second substrate 152, which may be a C/F substrate, may not have either of the liquid crystal material or the sealant deposited thereon. Furthermore, both the liquid crystal material and the sealant may be deposited on the first substrate 151, which may be a C/F substrate, and the second substrate 152, which may be a TFT array substrate, may not have either of the liquid crystal material or the sealant deposited thereon.

The bonding unit 120 may be provided within the vacuum processing chamber 121, and may include an upper stage 122a, a lower stage 122b, and a moving means 123 for selectively moving either one or both of the upper and lower stages 122a and 122b. Accordingly, the upper stage 122a may be provided at an upper side of the vacuum processing chamber 121 to hold the second substrate 152 and, the lower stage 122b may be provided at a lower side of the vacuum processing chamber 121 to hold the first substrate 151. The bonding unit 120 may bond the first and second substrates 151 and 152 to produce bonded substrates.

The hardening unit 140 may include a photo-curing (photo-hardening) unit 141, which may subject the bonded substrates to an emitted light such as UV, for example, and thermal hardening unit 142, which may heat the bonded substrates. Accordingly, the hardening unit 140 may include the photo-curing unit 141 and the thermal hardening unit 142 as a single processing unit. Alternatively, the hardening unit 140 may include the photo-curing unit 141 and the thermal hardening unit 142 as multiple processing units. If the hardening unit 140 is provided with both the photo-curing unit 141 and the thermal hardening unit 142, the photo-curing unit 141 receives the bonded substrates and cures the bonded substrates by the emitted light. Then, the thermal hardening unit 142 may receive the photo-cured, bonded substrates, and harden the sealant by processing under high temperature conditions. In addition, the thermal hardening unit 142 may permit the liquid crystal material to flow between the bonded substrates, thereby dispersing the liquid crystal material uniformly between the bonded substrates.

The loading/unloading units 130 may be provided between the first reverse unit 110, the bonding unit 120, and the hardening unit 140. The loading/unloading units 130 may include a first loading/unloading unit 131, a plurality of second loading/unloading units 132, a third loading/unloading unit 133, and a fourth loading/unloading unit 134. Each of the loading/unloading units 130 may include mechanical devices such as a robot-arm, for example, to obtain relatively high precision and accuracy in moving the substrates. Alternatively, the loading/unloading units 130 may include various types of devices for providing relatively high precision and accuracy and may combine various different types of devices such as conveyors and robot arms.

A processing time of each processing step may vary according to each individual processing modules (i.e., units). For example, a processing time for the plurality of bonding units 120 may be different than a processing time for the hardening unit 140. Accordingly, buffer units may be provided between any of the reverse, bonding, and hardening units to provisionally store any of the first and second substrates 151 and 152, as well as the bonded substrates prior to subsequent processing steps. The buffer units may have at least one substrate cassette in which a plurality of bonded substrates may be provisionally stored at multiple levels.

In FIG. 2B, a first buffer unit 161 may be provided at a first side, or sides of the first loading/unloading unit 131 for loading the first and second substrates 151 and 152 to the first reverse unit 110. A second buffer unit 162 may be provided at a side of the plurality of second loading/unloading units 132 for unloading the bonded substrates from the bonding unit 120 and at a side of the third loading/unloading unit 133 for loading the bonded substrates into the hardening unit 140. A third buffer unit 163 may be provided at a side of the fourth loading/unloading unit 134 for unloading the bonded substrates from the hardening unit 140. Each of the first, second, and third buffer units 161, 162 and 163 may be provided with a pair of substrate cassettes for temporarily storing each of the first and second substrates 151 and 152 in the first buffer unit 161, the bonded substrates in the second buffer unit 162, and the bonded substrates in the third buffer unit 163 after being processed in the hardening unit 140.

In FIG. 2B, a plurality of the bonding units 120 may be disposed to face each other, and the plurality of second loading/unloading units 132 may be provided between the first reverse unit 110 and each of the plurality of bonding units 120. Accordingly, the plurality of second loading/unloading units 132 may selectively load the first and second substrates 151 and 152 from the first reverse unit 110 into the plurality of bonding units 120, and simultaneously transfer the bonded substrates to the second buffer unit 162. In addition, the first reverse unit 110, the second buffer unit 162, and the second loading/unloading unit 131 may be arranged along a first line, and the plurality of bonding units 120 may be arranged along a second line that is perpendicular to the first line. The third loading/unloading unit 133 may be provided between the second buffer unit 162 and the photo-curing unit 141. The third loading/unloading unit 133 may load the bonded substrates into the photo-curing unit 141 from the second buffer unit 162. In addition, a fourth loading/unloading unit 134 may be provided between the photo-curing unit 141 and the thermal hardening unit 142. The fourth loading/unloading unit 134 may load the bonded substrate into the thermal hardening unit 142 from the photo-curing unit 141.

Operation of the exemplary apparatus for manufacturing a LCD device according to the present invention will be described with regard to FIGS. 2A and 2B. During a first transfer process, the first loading/unloading unit 131 may selectively transfer the first and second substrates 151 and 152 to the first reverse unit 110 from the first buffer unit 161. The first substrate 151 and the second substrate 152 may have undergone a plurality of processing steps prior to being placed into the first buffer unit 161. For example, the first and second substrates 151 and 152 may have undergone cleaning, liquid crystal material deposition, and sealant deposition processes prior to loading the first and second substrates 151 and 152 into the first buffer unit 161. In addition, the first and second substrates 151 and 152 may have undergone inspection processes prior to, or between the different clean, liquid crystal deposition, and sealant deposition processing. As previously described above, the first and second substrates 151 and 152 may have one of many different combinations of the liquid crystal material and/or sealant deposited thereupon. In addition, the first and second substrates 151 and 152 may alternatively include one of a C/F substrate and a TFT array substrate.

After the first transfer process, a first loading process may include individually loading the first and second substrates 151 and 152 into the first reverse unit 110 from the first buffer unit 161 by the first loading/unloading unit 131. Alternatively, the first loading process may include simultaneously loading the first and second substrates 151 and 152 into the first reverse unit 110 from the first buffer unit 161 by the first loading/unloading unit 131.

After the first loading process, a sensing process may include sensing by the first reverse unit 110 as to whether the first substrate 151 or the second substrates 152 has the liquid crystal material. During the sensing process, the first reverse unit 110 may sense each of the first and second substrates 151 and 152 by reading a specific indicia (not shown) that is assigned to each of the first and second substrates 151 and 152. For example, a distinctive mark or code may be disposed in an inactive region of each of the first and second substrates 151 and 152. Accordingly, the first reverse unit 110 may include a mark or code reader (not shown) that reads the mark or code of each of the first and second substrates 151 and 152 and senses whether the mark or code indicates that the first and second substrates 151 ad 152 does or does not have the liquid crystal material.

After the sensing process, a reversing process may performed in which the one of the first and second substrates 151 and 152 not having the liquid crystal material may be reversed (flipped).

After the reversing process, a second loading process may include individually loading the first and second substrates 151 and 152 into one of the plurality of bonding units 120 from the first reversing unit 110 by a plurality of the second loading/unloading units 132. Alternatively, the second loading process may include simultaneously loading the first and second substrates 151 and 152 into the plurality of bonding units 120 from the first reversing unit 110 by the plurality of second loading/unloading units 132.

During the second loading process, the substrate that includes the liquid crystal material (now referenced as the first substrate 151), may be loaded onto a lower stage 122b of the vacuum processing chamber 121 by a first of the plurality of second loading/unloading units 132. In addition, the substrate that does not include the liquid crystal material (now referenced as the second substrate 152), may be loaded onto an upper stage 122a of the vacuum processing chamber 121 by the first of the plurality of second loading/unloading units 132. Alternatively, the second substrate 152 may be loaded onto the upper stage 122a by a second of the plurality of second loading/unloading units 132.

After the second loading process, a bonding process may include a moving means 123 of the bonding unit 120 that may move at least one of the upper and lower stages 122a and 122b to press and bond the first and second substrates 151 and 152, thereby forming bonded substrates.

After the bonding process, a third loading process may include individually loading the bonded substrates into the second buffer unit 162 from each of the plurality of bonding units 120 by the plurality of second loading/unloading units 132. Alternatively, the third loading process may include simultaneously loading the bonded substrates into the second buffer unit 162 from the plurality of bonding units 140 by the plurality of second loading/unloading units 132.

After the third loading process, a fourth loading process may include individually loading the bonded substrates into the photo-curing unit 141 of the hardening unit 140 from the second buffer unit 162 by the third loading/unloading unit 133.

After the fourth loading process, a photo-curing process may include exposing the sealant disposed between the bonded substrates to light such as ultraviolet (UV) light, for example, thereby curing the sealant. The photo-curing unit 141 may include a mask such that a TFT array region of the TFT array substrate 151 is shielded from the light.

After the photo-curing process, a fifth loading process may include individually loading the bonded substrates into the thermal hardening unit 142 from the photo-curing unit 141 by the fourth loading/unloading unit 134. The thermal hardening unit 142 may expose the bonded substrates to elevated temperatures, thereby raising a temperature of the liquid crystal material. Accordingly, the liquid crystal material may flow to evenly disperse between the bonded substrates, and the sealant may harden.

After the fifth loading process, a sixth loading process may include individually loading the bonded substrates into a third buffer unit 163 from the thermal hardening unit 142 by the fourth loading/unloading unit 134. Then, the bonded substrates may be transferred for further processing.

FIG. 3 shows another exemplary apparatus for manufacturing an LCD device according to the present invention. The exemplary apparatus shown in FIG. 3 may include the features shown in FIGS. 2A and 2B, and may include a plurality of supplemental pressing units 170 arranged between the plurality of bonding units 120 and the hardening unit 140. The supplemental pressing units 170 may additionally apply pressure to the bonded substrates to improve a bonding state between the bonded substrates. In addition, each of the plurality of supplemental pressing units may be arranged at opposing sides of the third loading/unloading unit 133. The third loading/unloading unit 133 may individually load the bonded substrates into one of the supplemental pressing units 170 from the second buffer unit 162. In addition, the third loading/unloading unit 133 may also individually load the bonded substrates into the photo-curing unit 141 of the hardening unit 140 from the supplemental pressing units 170. Accordingly, an addition loading process may include individually loading the bonded substrates into the photo-curing unit 141 from the supplemental pressing units 170 without the need for an additional loading/unloading unit.

In FIG. 3, the second buffer unit 162 and the supplemental pressing units 170 may not be formed along a single line. Accordingly, the third loading/unloading unit 133 may be provided along another line with the second buffer unit 162 and the photo-hardening unit 141, and the supplemental pressing units 170 may be provided along a line perpendicular to the third loading/unloading unit 133. Accordingly, the first and second substrates 151 and 152 may first be bonded by the bonding unit 120, and then additionally pressed by the supplemental pressing unit 170. Then, the third loading/unloading unit 133 may transfer the bonded substrates additionally pressed by the supplemental pressing units 170 to the second buffer unit 162.

FIG. 4 shows another exemplary apparatus for manufacturing an LCD device according to the present invention. The exemplary apparatus shown in FIG. 4 may include the features shown in FIGS. 2A and 2B, and may include a second reverse unit 180 arranged between the plurality of bonding units 120 and the hardening unit 140. The second reverse unit 180 may selectively reverse the bonded substrates bonded by the plurality of bonding units 120.

Figure 5A:
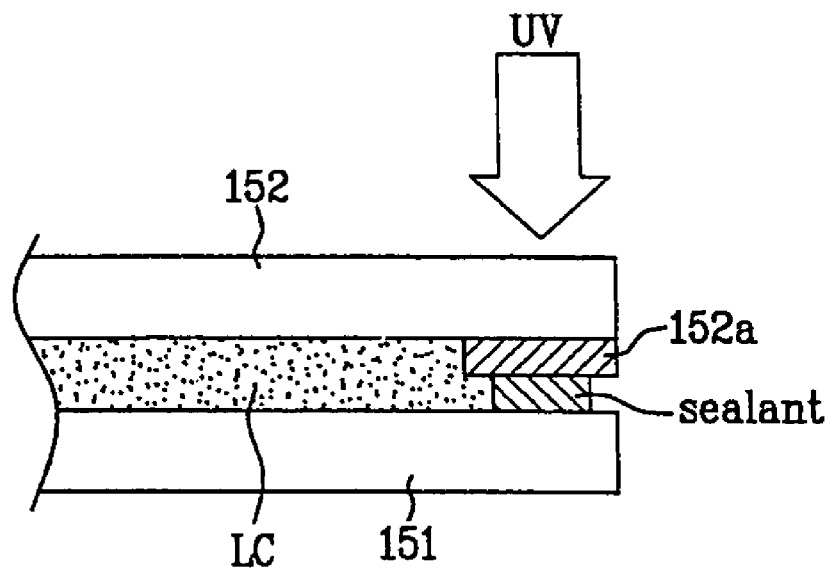
FIGS. 5A and 5B show cross sectional views of main portions an exemplary LCD device illustrating photo-hardening degree states of the sealant according to relative positions of the bonded substrates during a photo-curing process according to the present invention.
Figure 5B:
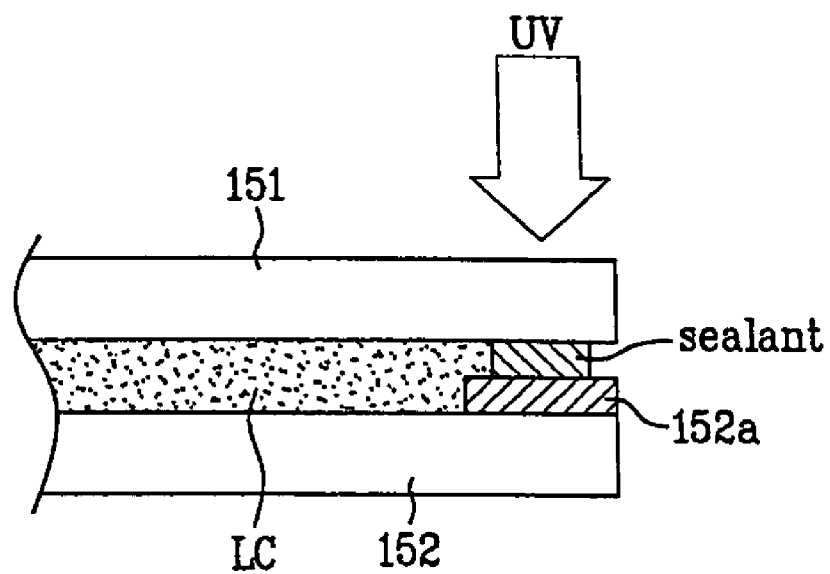

FIGS. 5A and 5B show cross sectional views of main portions an exemplary LCD device illustrating photo-hardening degree states of the sealant according to relative positions of the bonded substrates during a photo-curing process according to the present invention. In FIGS. 5A and 5B, black matrix films 152a may be formed on the second substrate 152 (C/F substrate) except for regions corresponding to pixel regions of the first substrate 151 (TFT array substrate). The black matrix films 152 prevent the light emitted during the photo-curing unit 141 from reaching the sealant. Accordingly, the sealant may not be sufficiently hardened.

The second reverse unit 180 may include a sensing unit that may sense whether the black matrix films 152a are formed on the C/F substrate 152 or on the TFT array substrate 151. In cases where the black matrix films 152a are formed on the C/F substrate 152, the bonded substrates are reversed by the second reverse unit 180 shown in FIG. 4. Accordingly, the sealant will be exposed to the light in the photo-curing unit 141, thereby sufficiently hardening the sealant. The sensing unit may read a specific indicia (not shown) that is assigned to each of the bonded substrates. For example, a distinctive mark or code may be disposed in an inactive region of each of the bonded substrates. The second reverse unit 180 may include a mark or code reader (not shown) that reads the mark or code of each of the bonded substrates, and senses whether the mark or code indicates that the upper bonded substrate is a C/F substrate or a TFT array substrate. Accordingly, during the operation of the apparatus shown in FIG. 4, a second reverse process may be necessary after the third loading process. During the second reverse process, the bonded substrates that are sensed to have a C/F substrate as the uppermost substrate may be individually loaded into the second reverse unit 180 from the plurality of bonding units 120 by the second loading/unloading units 132. Then, the second reverse unit 180 reverses an orientation of the bonded substrates such that the TFT array substrate is now the uppermost substrate. The reversed bonded substrate is loaded to the second buffer unit 162 from the second reverse unit 180 by one of the second loading/unloading units 132, or by the third loading/unloading unit 133. Alternatively, an additional loading/unloading unit may be incorporated, whereby neither of the second loading/unloading units 132 nor the third loading/unloading unit 133 need to be used.

Figure 6:
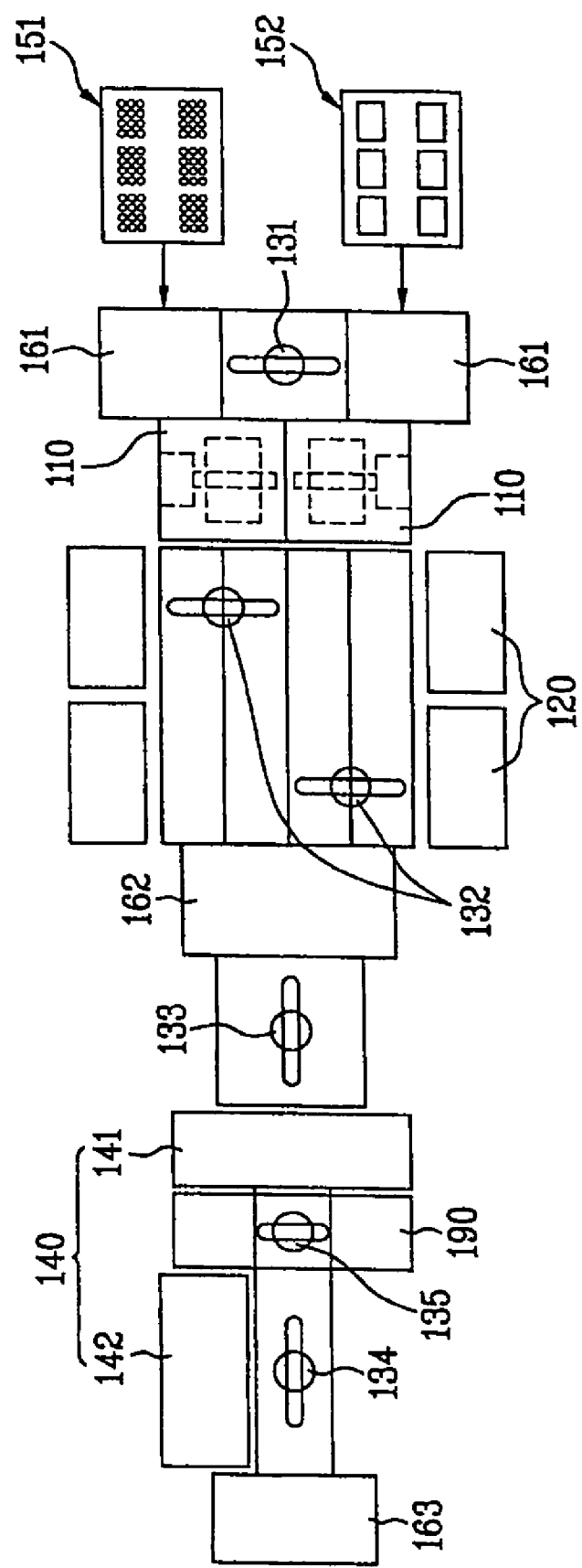
FIG. 6 shows another exemplary apparatus for manufacturing an LCD device according to the present invention.

FIG. 6 shows another exemplary apparatus for manufacturing an LCD device according to the present invention. The exemplary apparatus shown in FIG. 6 may include the features shown in FIGS. 2A and 2B, and may include bonding degree sensing units 190 for sensing a degree of bonding between the bonded substrate provided between the photo-curing unit 141 and the thermal hardening unit 142, and a fifth loading/unloading unit 135 provided between the bonding degree sensing units 190, the photo-curing unit 141, and the fourth loading/unloading unit 134. The fifth loading/unloading unit 135 may load the bonded substrates into the bonding degree sensing units 190 from the photo-curing unit 141, and may load the bonded substrates into the thermal-hardening unit 142 if the bonding degree of the bonded substrates are determined to be sufficient by the bonding degree sensing units 190. Alternatively, the fifth loading/unloading unit 135 may be omitted, and the fourth loading/unloading unit 134 may load the bonded substrates between the photo-curing unit 141, the bonding degree sensing units 190, and the thermal-hardening unit 142. Moreover, it may not be necessary to provide the bonding degree sensing unit 190 between the photo-hardening unit 141 and the thermal hardening unit 142.

Alternatively, the bonding degree sensing units 190 may be provided at a processing region after the plurality of bonding units 120 and before the hardening unit 140, thereby removing bonded substrates with insufficient bond degree and preventing unnecessary processing time of the bonded substrates.

It will be apparent to those skilled in the art than various modifications and variations can be made in the apparatus and method for manufacturing a liquid crystal display device of the present invention without departing from the spirit or scope of the invention. Thus, it is intended that the present invention cover the modifications and variations of this invention provided they come within the scope of the appended claims and their equivalents.

What is claimed is:

1. A method for manufacturing an LCD, comprising the steps of:
    reversing a first substrate on which a sealing material has been dropped;
    determining that the first substrate does not have a liquid crystal material deposited thereon in response to reading an identifier on a non-display area of the first substrate prior to the reversing the first substrate;
    loading the first reversed substrate and a second substrate, the second substrate having a liquid crystal material deposited thereon into a bonding unit;
    bonding the first and second substrates; and
    storing the bonded substrate in a buffer unit.

2. The method according to claim 1, wherein one of the first and second substrates includes a color filter substrate, and another one of the first and second substrates includes a TFT array substrate.

3. The method according to claim 1, further comprising a step of hardening the bonded substrates.

4. The method according to claim 3, wherein the step of hardening includes photo-curing.

5. The method according to claim 4, wherein the photo-curing includes emission of UV light.

6. The method according to claim 3, wherein the step of hardening includes steps of photo-curing and thermal-hardening of the bonded substrates.

7. The method according to claim 6, wherein the step of photo-curing includes emission of UV light.

8. The method according to claim 6, further comprising a step of transferring the bonded substrates after the step of photo-curing and before the step of thermal-hardening the bonded substrates.

9. The method according to claim 3, wherein the step of storing the bonded substrates is performed before the step of hardening the bonded substrates.

10. The method according to claim 1, further comprising a step of transferring the bonded substrates before the step of hardening the bonded substrates and after the step of storing the bonded substrates.

11. The method according to claim 3, wherein the step of storing the bonded substrates is performed after the step of hardening the bonded substrates.

12. The method according to claim 1, further comprising a step of storing the first and second substrates before the step of reversing the first substrate.

13. The method according to claim 12, further comprising a step of transferring the first and second substrates after the step of storing the first and second substrates.

14. A liquid crystal display device manufactured by a method, comprising the steps of:
    reversing a first substrate on which a sealing material has been dropped;
    determining that the first substrate does not have a liquid crystal material deposited thereon in response to reading an identifier on a non-display area of the first substrate prior to the reversing the first substrate;
    loading the first reversed substrate and a second substrate, the second substrate having a liquid crystal material deposited thereon into a bonding unit;
    bonding the first and second substrates; and
    storing the bonded substrate in a buffer unit.

15. The liquid crystal display device according to claim 14, wherein one of the first and second substrates includes a color filter substrate, and another one of the first and second substrates includes a TFT array substrate.

16. A method for manufacturing a liquid crystal display device, comprising:
    preparing a first substrate and a second substrate, wherein one of the first and second substrates includes a thin film transistor array;
    applying liquid crystal to the first substrate;
    temporarily storing at least one of the first and second substrates in a storage unit;
    flipping the second substrate having a sealant dropped thereon;
    determining that the second substrate does not have a liquid crystal material deposited thereon in response to reading an identifier on a non-display area of the second substrate prior to the flipping the second substrate;
    loading the flipped second substrate and first substrate having the liquid crystal deposited thereon into a bonding unit;
    aligning the first and second substrates with each other;
    bonding the first and second substrates together using the sealant;
    venting the bonding unit;
    loading a new substrate to be bonded into the bonding unit;
    unloading the bonded first and second substrates from the bonding unit; and
    hardening the sealant between the bonded substrates, wherein said hardening comprises one of either photo-curing using an emission of UV light or thermal hardening.

17. The method of claim 16, wherein a gap of a predetermined height defined between the first and second substrates is maintained, wherein a combined thickness of the first and second substrates is substantially uniform throughout the entire bonded first and second substrates.

18. The method of claim 16, wherein venting the bonding unit includes injecting dry gas into the bonding unit to maintain a pressure within the bonding unit, the pressure being greater than a previous pressure in the bonding unit.

* * * * *